United States Patent
Nagata et al.

(10) Patent No.: US 6,575,498 B2
(45) Date of Patent: Jun. 10, 2003

(54) WEBBING RETRACTOR

(75) Inventors: Tomonori Nagata, Aichi-ken (JP); Shinji Mori, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 58 days.

(21) Appl. No.: 09/875,256

(22) Filed: Jun. 7, 2001

(65) Prior Publication Data

US 2002/0005640 A1 Jan. 17, 2002

(30) Foreign Application Priority Data

Jun. 13, 2000 (JP) .................................. 2000-177300
Mar. 21, 2001 (JP) .................................. 2001-080498

(51) Int. Cl.$^7$ ............................................. B06R 22/46
(52) U.S. Cl. ................... 280/806; 242/374; 297/480
(58) Field of Search .................. 280/806; 242/374; 297/480; 60/632, 638

(56) References Cited

U.S. PATENT DOCUMENTS

| 3,891,271 | A | | 6/1975 | Fieni | |
|---|---|---|---|---|---|
| 5,169,173 | A | * | 12/1992 | Nishizawa | 180/282 |
| 5,207,618 | A | * | 5/1993 | Nishizawa | 280/806 |
| 5,377,554 | A | * | 1/1995 | Reulein et al. | 280/806 |
| 5,863,009 | A | * | 1/1999 | Bauer et al. | 242/374 |
| 6,089,492 | A | * | 7/2000 | Nagata et al. | 242/374 |
| 6,155,512 | A | * | 12/2000 | Specht et al. | 242/374 |
| 6,343,758 | B1 | * | 2/2002 | Abe et al. | 242/374 |
| 6,435,440 | B1 | * | 8/2002 | Hori | 242/374 |
| 6,454,199 | B1 | * | 9/2002 | Hori et al. | 242/374 |
| 6,454,306 | B1 | * | 9/2002 | Cunningham et al. | 102/202.14 |

FOREIGN PATENT DOCUMENTS

JP 10-67300 3/1998

* cited by examiner

Primary Examiner—Lesley D. Morris
Assistant Examiner—Paul Royal, Jr.
(74) Attorney, Agent, or Firm—Nixon Peabody LLP; Thomas W. Cole

(57) ABSTRACT

In a webbing retractor, when a vehicle is in an emergency, a pretensioner mechanism supplies gas in a cylinder. A slider substantially closes a gas passing portion, and a piston thereby starts to move upward. A fitting portion pushes the slider upward so as to maintain the closure of the gas passing portion, and a webbing is taken up. When an energy absorbing member in a force limiter mechanism is deformed such that the webbing is pulled out, the piston is moved downward, the gas passing portion is opened by the slider so as to discharge the gas in the cylinder from the gas passing portion.

22 Claims, 12 Drawing Sheets

FRONT SIDE ← → REAR SIDE

LEFT SIDE ← → RIGHT SIDE

F I G. 6
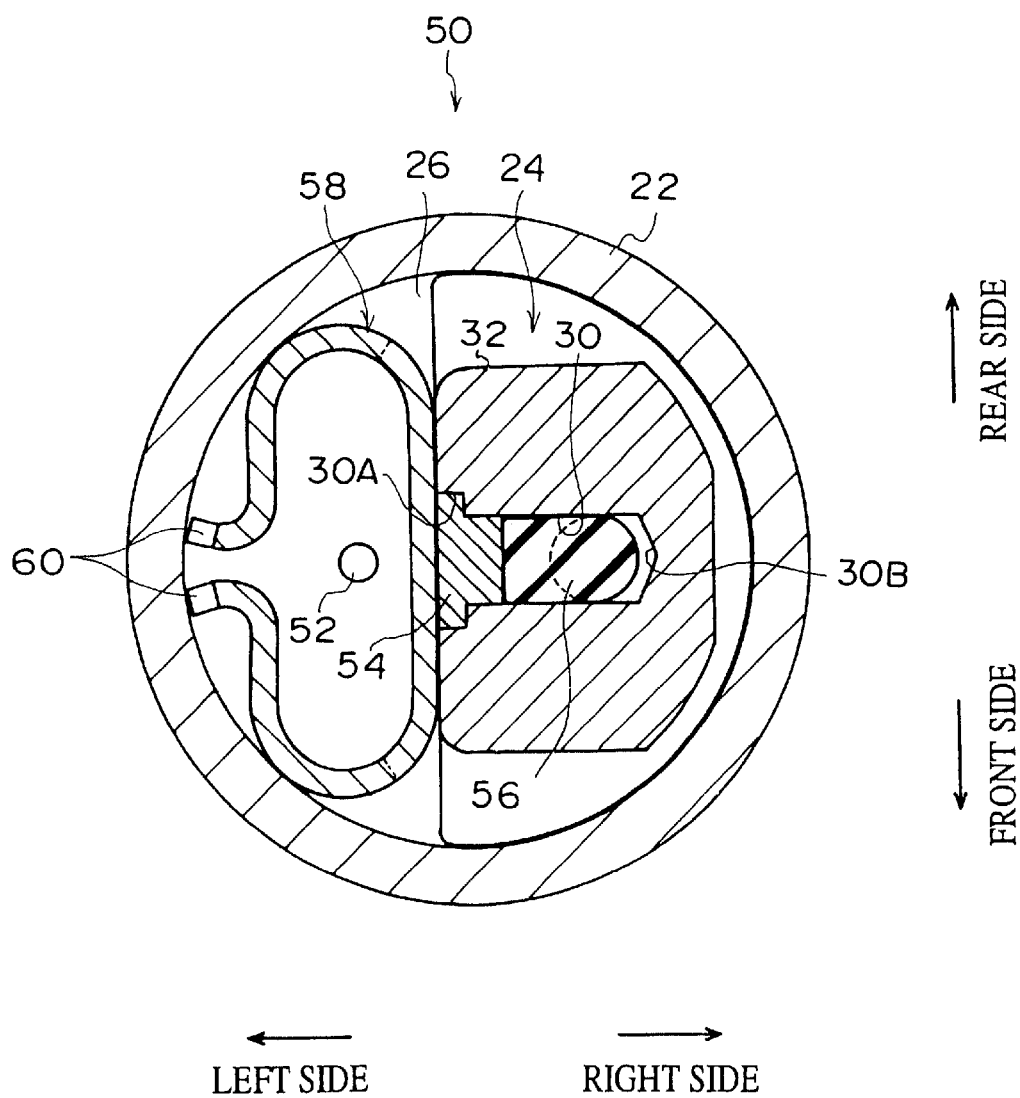

RIGHT SIDE ← → LEFT SIDE

REAR SIDE ← → FRONT SIDE

WEBBING RETRACTOR

BACKGROUND OF THE INVENTION

1. Field of the Invention

The present invention relates to a webbing retractor which has a pretensioner mechanism for eliminating slackness of a webbing when a vehicle is in an emergency and a force limiter mechanism for limiting an amount of load applied to a vehicle occupant by the webbing to a fixed amount or less when a vehicle is in an emergency.

2. Description of the Related Art

There are webbing retractors with which a pretensioner mechanism, which eliminates slackness of a webbing when a vehicle is in an emergency, e.g., a collision, is provided.

In a webbing retractor having, among such a pretensioner mechanism, for example a so-called rack and pinion type pretensioner mechanism, a pinion is connected to a shaft for taking up the webbing. The pinion always rotates integrally with the take-up shaft. A substantially hollow cylinder is provided in the vicinity of the pinion. When a vehicle is in an emergency, gas is supplied to the cylinder.

A piston is movably provided within the cylinder. A fitting portion is formed at the lower portion of the piston. The fitting portion substantially fits into an inner wall of the cylinder. When a vehicle is in an emergency, the piston receives the gas pressure from below the fitting portion so as to be moved upward within the cylinder. A rack is provided at the upper portion of the piston. Due to moving upward of the piston, the rack meshes with the pinion such that the pinion is rotated in the direction in which the webbing is taken up. Thus, the webbing is taken up onto the take-up shaft when a vehicle is in an emergency to eliminate slackness of the webbing.

Further, the above-described webbing retractor is provided with a force limiter mechanism which limits an amount of load exerted upon a vehicle occupant by the webbing to a fixed amount or less when a vehicle is in an emergency.

Such a force limiter mechanism is provided with, for example, an energy absorbing member. The energy absorbing member is deformed by a load of a vehicle occupant onto the webbing when a vehicle is in an emergency, so that the take-up shaft is rotated in the direction in which the webbing is pulled out. Thus, when a vehicle is in an emergency, the webbing is pulled out from the take-up shaft, so that a load exerted upon a vehicle occupant by the webbing is limited to a fixed amount or less.

However, in such a webbing retractor, when the force limiter mechanism is operated, the take-up shaft is rotated in the direction in which the webbing is pulled out. Accordingly, the pinion is rotated in the direction in which the webbing is pulled out such that the piston is moved downward via the rack within the cylinder. The gas pressure within the cylinder (below the fitting portion) is increased to inhibit moving downward of the piston. Rotation of the take-up shaft via the rack and the pinion in the direction in which the webbing is pulled out is thereby inhibited, so that pulling out of the webbing is inhibited.

As illustrated in FIG. 12, a so-called force limiter load (which is equal to a load required for the webbing to be pulled out when a vehicle is in an emergency) is a load (a load shown by the portion A in FIG. 12) that a load by the gas pressure within the cylinder (the pressure which is increased due to moving downward of the piston) is added to a load required for the energy absorbing member to be deformed. Thus, there arises a problem that the degree of freedom of the setting of the force limiter load is narrowed.

SUMMARY OF THE INVENTION

In view of the aforementioned facts, an object of the present invention is to obtain a webbing retractor which can broaden the degree of freedom of the setting of a force limiter load.

A first aspect of the present invention is a webbing retractor which comprises a take-up shaft for taking up a webbing, a pretensioner mechanism which has a substantially hollow cylinder and a piston which is provided within the cylinder and with which a fitting portion which substantially fits into the inner wall of the cylinder is provided, and in which when a vehicle is in an emergency, gas is supplied within the cylinder and below said fitting portion such that the piston is moved upward due to the gas pressure to rotate the take-up shaft in the direction in which said webbing is taken up, and a force limiter mechanism having a deformable energy absorbing member in which when a vehicle is in an emergency, the energy absorbing member is deformed due to a load of a vehicle occupant upon the webbing such that the take-up shaft is rotated in the direction in which the webbing is pulled out to move the piston downward, and the webbing retractor comprising a gas passing portion which is provided at the piston and from which the gas can be discharged from below to above the fitting portion, and a closing device which is provided so as to correspond to a hole portion of the gas passing portion, substantially closes the gas passing portion under normal circumstances, maintains the state in which the gas passing portion is substantially closed when the piston is moved upward by the pretensioner mechanism, and which opens the gas passing portion when the piston is moved downward by the force limiter mechanism.

The webbing retractor of a first aspect of the present invention is provided with the pretensioner mechanism. When a vehicle is in an emergency, gas is supplied within the cylinder (below the fitting portion of the piston). As the gas passing portion of the piston is generally substantially closed by the closing device, gas within the cylinder is not discharged from the gas passing portion. Thus, the piston starts to be moved upward due to the gas pressure. When the piston is moved upward, the state in which the gas passing portion is substantially closed by the closing device is maintained. Thus, the piston continues to be moved upward such that the take-up shaft is rotated in the direction in which the webbing is taken up. Accordingly, when a vehicle is in an emergency, the webbing is taken up onto the take-up shaft such that slackness of the webbing is eliminated.

The webbing retractor of the first aspect of the present invention is provided with the force limiter mechanism. When a vehicle is in an emergency, the energy absorbing member is deformed by a load of a vehicle occupant upon the webbing such that the take-up shaft is rotated in the direction in which the webbing is pulled out. Accordingly, when a vehicle is in an emergency, the webbing is pulled out from the take-up shaft such that an amount of a load exerted on a vehicle occupant by the webbing is limited to a fixed amount or less.

In the force limiter mechanism, the take-up shaft is rotated in the direction in which the webbing is pulled out such that the piston is moved downward. When the piston is moved downward, the gas passing portion of the piston is opened by the closing device. Then, gas within the cylinder (below the fitting portion) is discharged from the gas passing portion. It is possible to prevent that moving downward of the piston is inhibited due to gas within the cylinder such that pull-out of the webbing is also inhibited.

A force limiter load (i.e., a load required for the webbing to be pulled out when a vehicle is in an emergency) can be determined by only a load required for the energy absorbing member to be deformed. Accordingly, the degree of freedom of the setting of the force limiter load can be broadened.

In the webbing retractor of the first aspect of the present invention, preferably the closing device is disposed on the fitting portion to substantially close the gas passing portion under normal circumstances. When the piston is moved upward by the pretensioner mechanism, the closing device is pushed upward by the fitting portion such that the state in which the gas passing portion is substantially closed is maintained. Further, when the piston is moved downward by the force limiter mechanism, the closing device is remained further upward than the gas passing portion, and the gas passing portion is thereby opened.

In accordance with the webbing retractor of the first aspect of the present invention, preferably, the closing device is generally disposed on the fitting portion of the piston such that the gas passing portion of the piston is substantially closed.

When the piston is moved upward by the pretensioner mechanism, the closing device is pushed upward by the fitting portion so as to be moved upward integrally with the piston. Thus, the state in which the gas passing portion is substantially closed by the closing device can be maintained.

When the piston is moved downward by the force limiter mechanism, a load of a vehicle occupant upon the webbing is transmitted via the take-up shaft to the piston. A descending speed of the piston is faster than a speed at which the closing device is moved downward due to free fall. Thus, the closing device is remained further upward than the gas passing portion such that the gas passing portion can be opened.

A closing device which substantially closes or opens the gas passing portion, for example in an electrical manner needs not to be used. As a result, it is possible to simplify the structure of the closing device.

Preferably the webbing retractor of the first aspect of the present invention further comprises a seal member which is provided so as to correspond to the gas passing portion. The seal member is interposed between the gas passing portion and the closing device so as to hermetically seal the gas passing portion. When the piston is moved upward by the pretensioner mechanism, the interposition of the seal member between the gas passing portion and the closing device is maintained so as to maintain the closure of gas passing portion. When the piston is moved downward by the force limiter mechanism, the interposition of the seal member between the gas passing portion and the closing device is released so as to open the gas passing portion.

In the above-described webbing retractor, the seal member is generally interposed between the gas passing portion and the closing device to seal the gas passing portion. Thus, moving upward of the piston can be started reliably.

When the piston is moved upward by the pretensioner mechanism, the seal member is moved upward integrally with the closing device and the piston. Accordingly, the state in which the seal member is interposed between the gas passing portion and the closing device is maintained. As a result, the state in which the gas passing portion is sealed by the seal member is maintained such that it is possible to maintain reliably moving upward of the piston.

When the piston is moved downward by the force limiter mechanism, for example, the closing device is remained further upward than the gas passing portion such that the state in which the seal member is interposed between the gas passing portion and the closing device is released. Then, the gas passing portion is opened. Gas within the cylinder can be still discharged from the gas passing portion.

A second aspect of the present invention is the webbing retractor of the first aspect comprising a closing device which has a cap capable of substantially closing the gas passing portion and a retainer disposed on the fitting portion so as to be able to inhibit the substantial closure of the gas passing portion by the cap from being released. In the closing device, when the piston is moved upward by the pretensioner mechanism, the retainer is pushed upward by the fitting portion to maintain the state in which said gas passing portion is substantially closed by the cap. When the piston is moved downward by the force limiter mechanism, the retainer is remained further upward than the fitting portion so as to release the state in which the gas passing portion is substantially closed by the cap.

In accordance with the webbing retractor of the second aspect of the present invention, the closing device includes a cap which can substantially closes the gas passing portion and a retainer which is disposed on the fitting portion such that it is possible to prevent the state in which the gas passing portion is substantially closed by the cap from being released. The retainer is generally disposed on the fitting portion and the cap substantially closes the gas passing portion.

When the piston is moved upward by the pretensioner mechanism, the retainer is pushed upward by the fitting portion. Thus, the state in which the gas passing portion is substantially closed by the cap can be maintained by the retainer.

When the piston is moved downward by the force limiter mechanism, a load of a vehicle occupant upon the webbing is transmitted via the take-up shaft to the piston. The descending speed of the piston is faster than a speed at which the retainer is moved downward due to free fall. Thus, the retainer is remained further upward than the fitting portion such that the state in which the gas passing portion is substantially closed by the cap is released. Then, the gas passing portion can be opened.

A device which substantially closes or opens the gas passing portion for example, in an electrical manner needs not to be used. Thus, it is possible to simplify the structure of the webbing retractor.

Preferably in the webbing retractor of the second aspect of the present invention, under normal circumstances or when the piston is moved upward by the pretensioner mechanism, an insertion member is inserted into the gas passing portion. Further when the piston is moved downward by the force limiter mechanism, the insertion member is discharged from the gas passing portion due to the gas pressure.

In the above-indicated webbing retractor, under normal circumstances or when the piston is moved upward by the pretensioner mechanism, because the insertion member is inserted into the gas passing portion, it is possible to further inhibit gas in the cylinder from being discharged from the gas passing portion. Thus, it is possible to prevent a decrease in a force required for the piston to be moved upward.

When the piston is moved downward by the force limiter mechanism, the insertion member is discharged from the gas passing portion due to the gas pressure. Thus, it is possible to discharge gas within the cylinder from the gas passing portion.

Preferably in the webbing retractor of the second aspect of the present invention, the gas passing portion has a bent portion and the insertion portion has elasticity. Further, the insertion member is bent and inserted into the bent portion under normal circumstances or when the piston is moved upward by the pretensioner mechanism.

In the above-indicated webbing retractor, under normal circumstances or when the piston is moved upward by the pretensioner mechanism, the insertion member having elasticity is bent and inserted into the bent portion of the gas passing portion. Thus, under normal circumstances or when the piston is moved upward by the pretensioner mechanism, the insertion member can appropriately close the gas passing portion.

Preferably in the webbing retractor of the present invention, friction is generated between the inner wall of the cylinder and the closing device when the piston in moved downward by the force limiter mechanism.

In the above-described state, when the piston is moved downward by the force limiter mechanism, friction is generated between the inner wall of the cylinder and the closing device. Thus, the closing device can be remained reliably further upward than the gas passing portion, and thus the gas passing portion can be opened reliably.

Even if friction is generated between the inner wall of the cylinder ad the closing device when the piston is moved upward by the pretensioner mechanism, the closing device is pushed upward by the fitting portion regardless of the friction. Thus, when the piston is moved upward by the pretensioner mechanism, the state in which the gas passing portion is substantially closed by the closing device can be still maintained.

In the webbing retractor of the present invention, when the piston is moved downward by the force limiter mechanism, the gas passing portion of the piston is opened by the closing device. Thus, it is possible to prevent that moving downward of the piston is inhibited due to gas within the cylinder such that pull-out of the webbing is also inhibited. The force limiter load can be determined by only a load required for the energy absorbing member to be deformed. Thus, the degree of freedom of the setting of the force limiter load can be broadened.

In accordance with the webbing retractor of the present invention, a closing device which substantially closes or opens the gas passing portion, for example in an electrical manner needs not to be used. Thus, it is possible to simplify the structure of the closing device.

In accordance with the webbing retractor of the present invention, friction is generated between the inner wall of the cylinder and the closing device when the piston is moved downward by the force limiter mechanism. Thus, the closing device can be remained further upward than the gas passing portion such that the gas passing portion can be opened reliably.

BRIEF DESCRIPTION OF THE DRAWINGS

FIG. 6 is a cross-sectional view of the interior of the cylinder when the piston is moved upward by the pretensioner mechanism relating to the second embodiment.

DESCRIPTION OF THE PREFERRED EMBODIMENTS

First Embodiment

Figure 1:
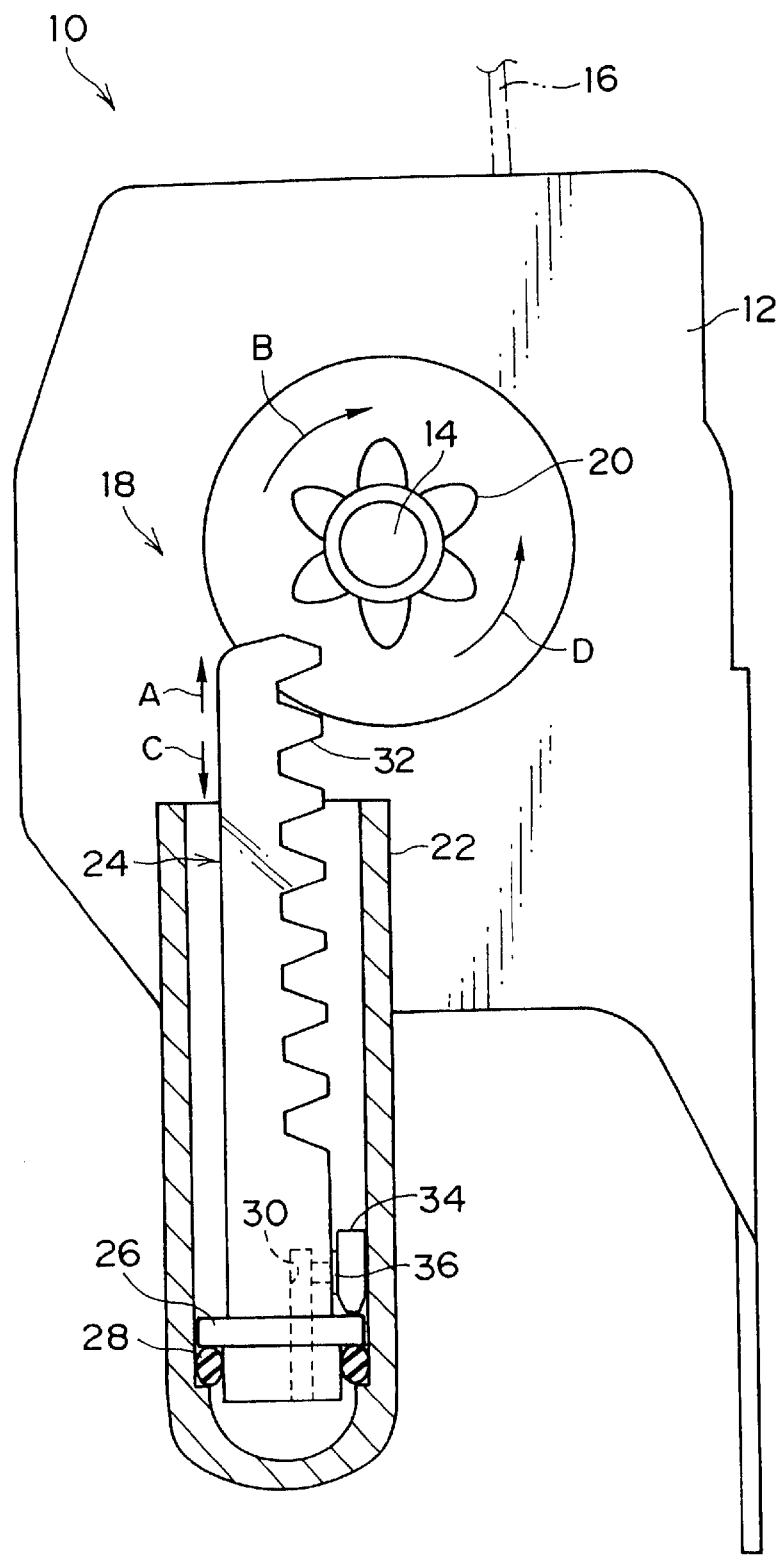
FIG. 1 is a side view of the schematic structure of a webbing retractor relating to a first embodiment of the present invention.

FIG. 1 is a side view of the schematic structure of a webbing retractor 10 relating to a first embodiment of the present invention.

The webbing retractor 10 has a frame 12. The frame 12 is fixed to a vehicle. A take-up shaft 14 is rotatably supported at the frame 12. A webbing 16 is taken up onto the take-up shaft 14.

The webbing retractor 10 is provided with a rack and pinion type pretensioner mechanism 18. A pinion 20 is connected to one end of the take-up shaft 14. The pinion 20 always rotates integrally with the take-up shaft 14 such that the webbing 16 can be taken up onto or pulled out from the take-up shaft 14.

A cylinder 22 is fixed to the frame 12. The cylinder 22 is formed in a substantially hollow cylindrical shape. An upper end side of the cylinder 22 is opened in the vicinity of the pinion 20. A gas-supply opening (not shown) is provided at a lower end side of the cylinder 22 (i.e., at the side of the cylinder opposite the side at which the pinion 20 is provided). A gas generating device (not shown) is connected to the gas-supply opening. When a vehicle is in an emergency, e.g., a collision, gas generated from the gas generating device is supplied to the cylinder 22 from the gas-supply opening.

A substantially cylindrical piston 24 is provided within the cylinder 22. The piston 24 can move within the cylinder 22. A disc-shaped fitting portion 26 is formed in the vicinity of the lower end of the piston 24 (i.e., the end portion of the piston 24 opposite the end at which the pinion is formed). The fitting portion 26 substantially fits into the inner wall of the cylinder 22. The gas-supply opening is formed below the fitting portion 26. When gas is supplied within the cylinder 22, as will be described in detail later, the lower end of the piston 24 and the fitting portion 26 receive the gas pressure such that the piston is moved upward in the direction indicated by the arrow A in FIG. 1.

An O-ring 28 made of resin is fitted at the lower portion of the piston 24 (i.e., below the fitting portion 26). The O-ring 28 contacts tightly the inner wall of the cylinder 22. Thus, gas from the gas-supply opening is prevented from flowing from a gap between the fitting portion 26 and the inner wall of the cylinder 22 toward above the fitting portion 26.

A gas passing portion 30 is formed at the lower portion of the piston 24. The gas passing portion 30 penetrates the piston 24 from the lower end of the piston 24 to upward of the fitting portion 26. Thus, gas from the gas-supply opening can be discharged via the gas passing portion 30 from below to above the fitting portion 26.

A rack 32 is provided at the upper portion of the piston 24. The rack 32 corresponds to the pinion 20. When the piston 24 is moved upward in the direction indicated by the arrow A in FIG. 1, the rack 32 meshes with the pinion 20. Thus, the take-up shaft 14 is rotated via the pinion 20 in the direction in which the webbing 16 is taken up (i.e., in the direction indicated by the arrow B in FIG. 1) such that the webbing 16 is taken up onto the take-up shaft 14.

The webbing retractor 10 is further provided with a force limiter mechanism (not shown). The force limiter mechanism has an energy absorbing member (not shown). When a vehicle is in an emergency, the energy absorbing member is deformed by a load of a vehicle occupant onto the webbing 16. The take-up shaft 14 is thereby rotated in the direction in which the webbing is pulled out (i.e., in the direction indicated by the arrow D in FIG. 1). As a result, the webbing 16 is pulled out from the take-up shaft 14 and the piston 24 is moved downward via the pinion 20 and the rack 32 in the direction indicated by the arrow C in FIG. 1.

A slider 34 serving as a retainer as well as a closing device is provided within the cylinder 22. The slider 34 corresponds to the above-described gas passing portion 30. The slider 34 is normally disposed on the fitting portion 26 of the piston 24 so as to substantially close the gas passing portion 30. If gas is supplied within the cylinder 22 by the pretensioner mechanism 18 when a vehicle is in an emergency, gas within the cylinder 22 is not discharged from the gas passing portion 30. Thus, the piston 24 starts moving upward due to the gas pressure.

When the piston 24 is moved upward as described above, as shown in FIG. 2, the slider 34 is pushed by the fitting portion 26 to be moved upward integrally with the piston 24. Thus, substantial closing of the gas passing portion 30 by the slider 34 is maintained such that moving upward of the piston 24 is also maintained.

Figure 3:
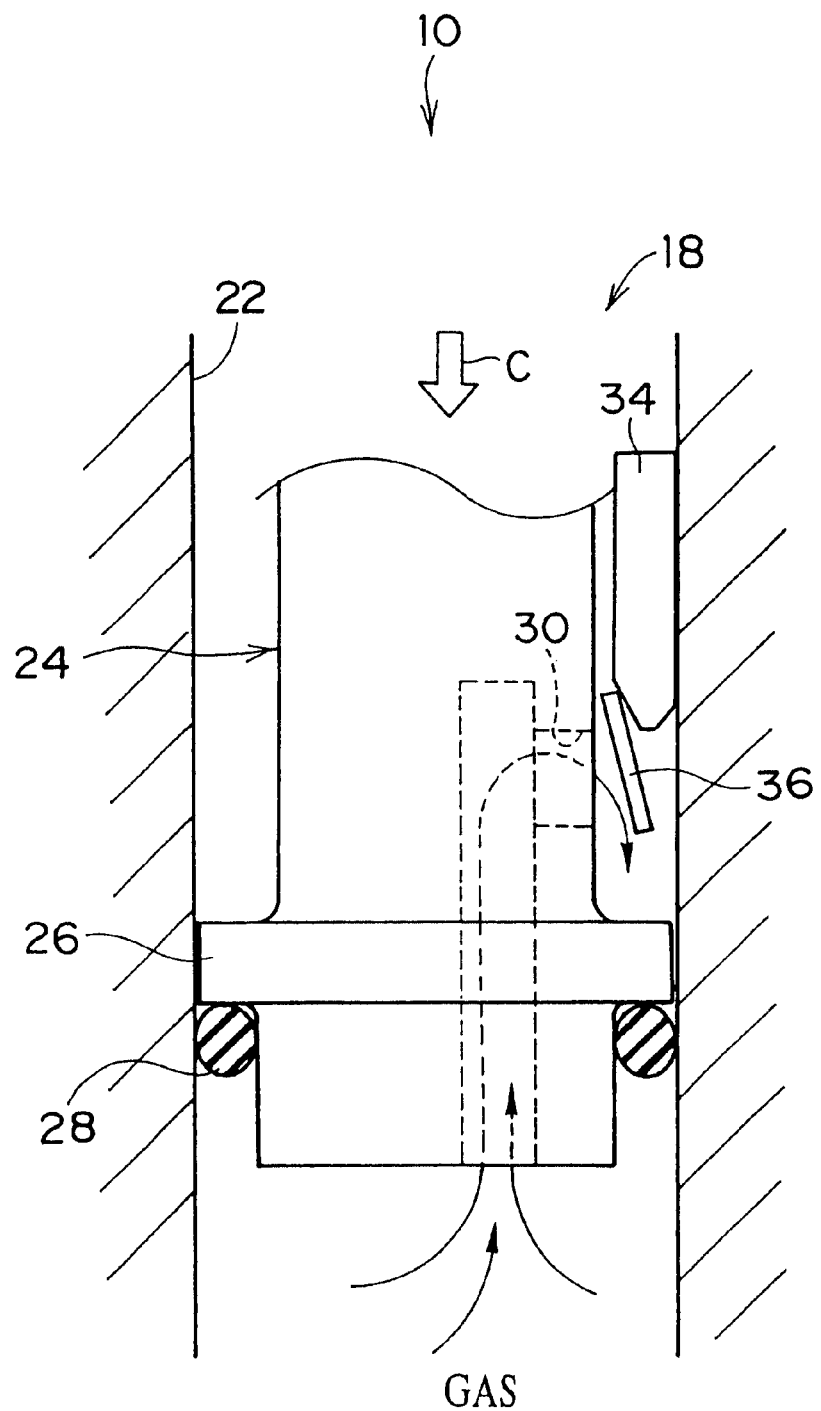
FIG. 3 is a side view of the interior of the cylinder when the piston is moved downward by a force limiter mechanism relating to the first embodiment.

When the piston 24 is moved downward by the force limiter mechanism, a load of a vehicle occupant onto the webbing 16 is transmitted via the take-up shaft 14, the pinion 20 and the rack 32 to the piston 24. Accordingly, a descending speed of the piston 24 is faster than a speed at which the slider 34 is moved downward due to free fall. Thus, as shown in FIG. 3, the slider 34 is remained further upward than the gas passing portion 30 such that the gas passing portion 30 is opened.

When the piston 24 is moved downward by the force limiter mechanism, gas within the cylinder 22 is discharged from the gas passing portion 30. Then, the gas is blown against the slider 34 via a seal member 36 to be described later such that friction is generated between the inner wall of the cylinder 22 and the slider 34. Thus, when the piston 24 is moved downward by the force limiter mechanism, the slider 34 is reliably remained further upward than the gas passing portion 30.

A seal member 36 which also functions as a cap and is made of resin is provided within the cylinder 22 so as to correspond to the gas passing portion 30 and the slider 34. The seal member 36 is generally interposed between the gas passing portion 30 and the slider 34 to hermetically seal the gas passing portion 30.

Figure 2:
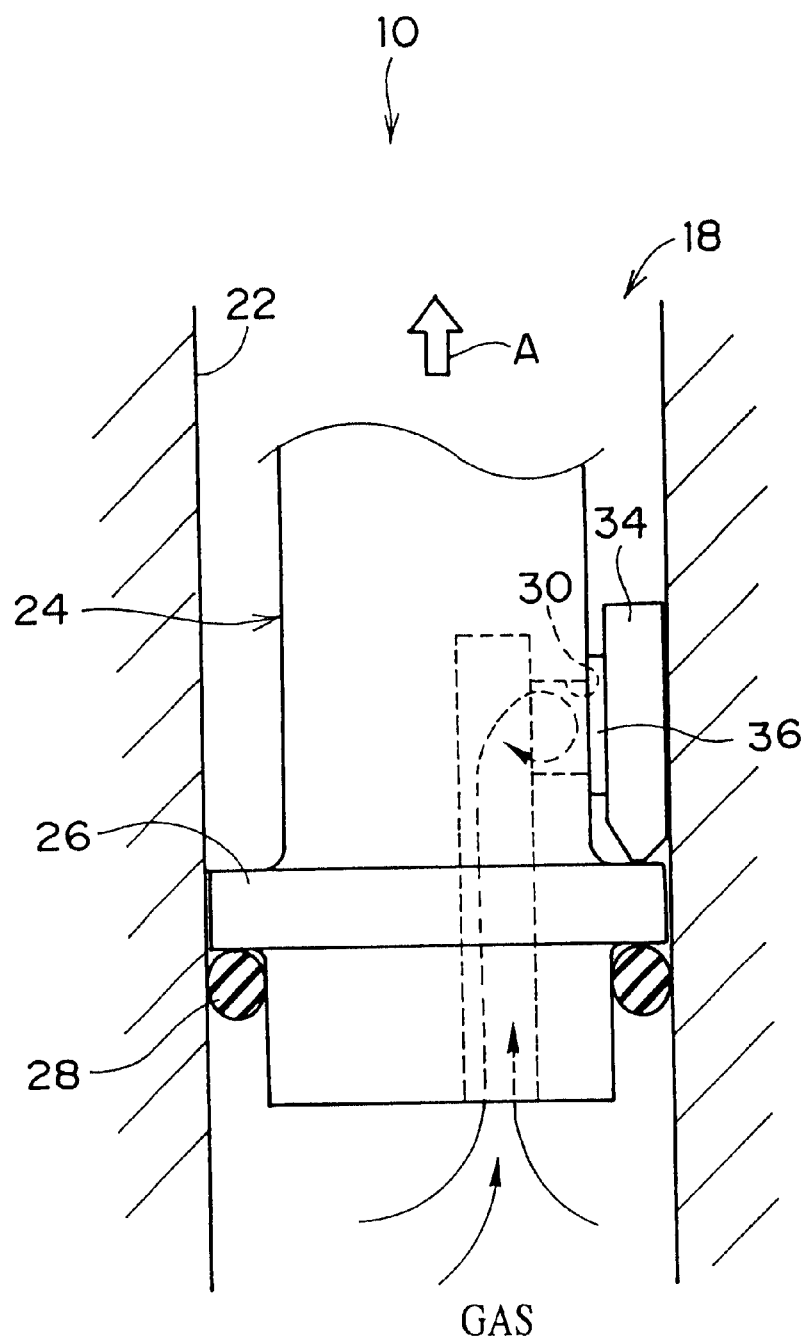
FIG. 2 is a side view of the interior of a cylinder when a piston is moved upward by a pretensioner mechanism relating to the first embodiment.

As shown in FIG. 2, when the piston 24 is moved upward by the pretensioner mechanism 18, the seal member 36 is moved upward integrally with the slider 34 and the piston 24. Thus, a state in which the seal member 36 is interposed between the gas passing portion 30 and the slider 34 is maintained such that a state in which the seal member 36 hermetically seals the gas passing portion 30 is also maintained.

As shown in FIG. 3, when the piston 24 is moved downward by the force limiter mechanism, the slider 34 is remained further upward than the gas passing portion 30. The state in which the seal member 36 is interposed between the gas passing portion 30 and the slider 34 is released such that the gas passing portion 30 is opened.

Next, an operation of the first embodiment will be described.

The webbing retractor 10 having the above-described structure is provided with the pretensioner mechanism 18. When a vehicle is in an emergency, gas generated in the gas generating device (not shown) is supplied from the gas-supply opening to the interior of the cylinder 22 (below the fitting portion 26 of the piston 24). The slider 34 is normally disposed on the fitting portion 26 such that the gas passing portion 30 of the piston 24 is substantially closed by the slider 34. Thus, gas within the cylinder 22 cannot be discharged from the gas passing portion 30. As a result, the piston 24 starts moving upward due to the gas pressure in the direction indicated by the arrow A in FIGS. 1 and 2 (i.e., toward the pinion 20).

As shown in FIG. 2, when the piston 24 is moved upward, the slider 34 is pushed upward by the fitting portion 26 so as to be moved upward integrally with the piston 24. Thus, substantial closing of the gas passing portion 30 by the slider 34 is maintained. The piston 24 continues to be moved upward, so that the take-up shaft 14 is rotated via the rack 32 and the pinion 20 in the direction in which the webbing 16 is taken up (i.e., in the direction indicated by the arrow B in FIG. 1). Accordingly, when a vehicle is in an emergency, the webbing 16 is taken up onto the take-up shaft 14 such that slackness of the webbing 16 is eliminated.

The webbing retractor 10 is provided with the force limiter mechanism (not shown). When a vehicle is in an emergency, the energy absorbing member (not shown) is deformed due to a load of a vehicle occupant upon the webbing 16 such that the take-up shaft 14 is rotated in the direction in which the webbing is pulled out (i.e., in the direction indicated by the arrow D in FIG. 1). Thus, when a vehicle is in an emergency, the webbing 16 is pulled out from the take-up shaft 14 such that an amount of load exerted upon a vehicle occupant by the webbing 16 is limited to a fixed amount or less.

At the force limiter mechanism, the take-up shaft 14 is rotated in the direction in which the webbing 16 is pulled out such that the piston 24 is moved downward via the pinion 20 and the rack 32 in the direction indicated by the arrow C in FIGS. 1 and 2. When the piston 24 is moved downward, a load of a vehicle occupant upon the webbing 16 is transmitted via the take-up shaft 14, the pinion 20 and the rack 32 to the piston 24. A descending speed of the piston is faster than a speed at which the slider 34 is moved downward due to free fall. Thus, as shown in FIG. 3, the slider 34 is remained further upward than the gas passing portion 30 such that the gas passing portion 30 is opened. As a result, gas within the cylinder 22 (below the fitting portion 26) is discharged from the gas passing portion 30. It is possible to prevent that the gas in the cylinder 22 hinders downward movement of the piston 24 and pull-out of the webbing 16.

A force limiter load (i.e., a load required for the webbing 16 to be pulled out when a vehicle is in an emergency) can be determined by only a load required for the energy absorbing member to be deformed. Thus, the degree of freedom in setting the force limiter load can be broadened.

Further when the piston 24 is moved downward by the force limiter mechanism, gas within the cylinder 22 is discharged from the gas passing portion 30 and is blown off the slider 34 via the seal member 36. Accordingly, friction is generated between the inner wall of the cylinder 22 and the slider 34. The slider 34 can thereby be reliably remained further upward than the gas passing portion 30. Thus, the gas passing portion 30 can be opened reliably.

Even if friction is generated between the inner wall of the cylinder 22 and the slider 34 when the piston 24 is moved upward by the pretensioner mechanism 18, the slider 34 is pushed upward by the fitting portion 26 regardless of the friction. Thus, when the piston 24 is moved upward by the pretensioner mechanism 18, substantial closing of the gas passing portion 30 by the slider 34 can be still maintained.

The above-described slider 34 can be used as a closing device. Thus, an electrical closing device for substantially closing or opening the gas passing portion is not needed. As a result, it is possible to simplify the structure of the closing device.

The seal member 36 is generally interposed between the gas passing portion 30 and the slider 34 to seal the gas passing portion 30. Thus, it is possible for the piston 24 to start moving upward in a reliable manner.

As shown in FIG. 2, when the piston 24 is moved upward by the pretensioner mechanism 18, the seal member 36 is moved upward integrally with the slider 34 and the piston 24. The state in which the seal member 36 is interposed between the gas passing portion 30 and the slider 34 is thereby maintained. Sealing of the gas passing portion 30 by the seal member 36 is maintained such that moving upward of the piston 24 can be maintained reliably.

Further as shown in FIG. 3, when the piston 24 is moved downward by the force limiter mechanism, the slider 34 is remained further upward than the gas passing portion 30. Interposing of the seal member 36 between the gas passing portion 30 and the slider 34 is thereby released, so that the gas passing portion 30 is opened. Thus, gas within the cylinder 22 can still be discharged from the gas passing portion 30.

In the first embodiment, the slider 34 is used as a closing device. However, a closing device which substantially electrically closes or opens the gas passing portion may be used.

In the first embodiment, the seal member 36 is formed separately from the slider 34 and interposed between the gas passing portion 30 and the slider 34. The seal member may be formed integrally with the slider and interposed between the gas passing portion and the slider.

Second Embodiment

Figure 4:
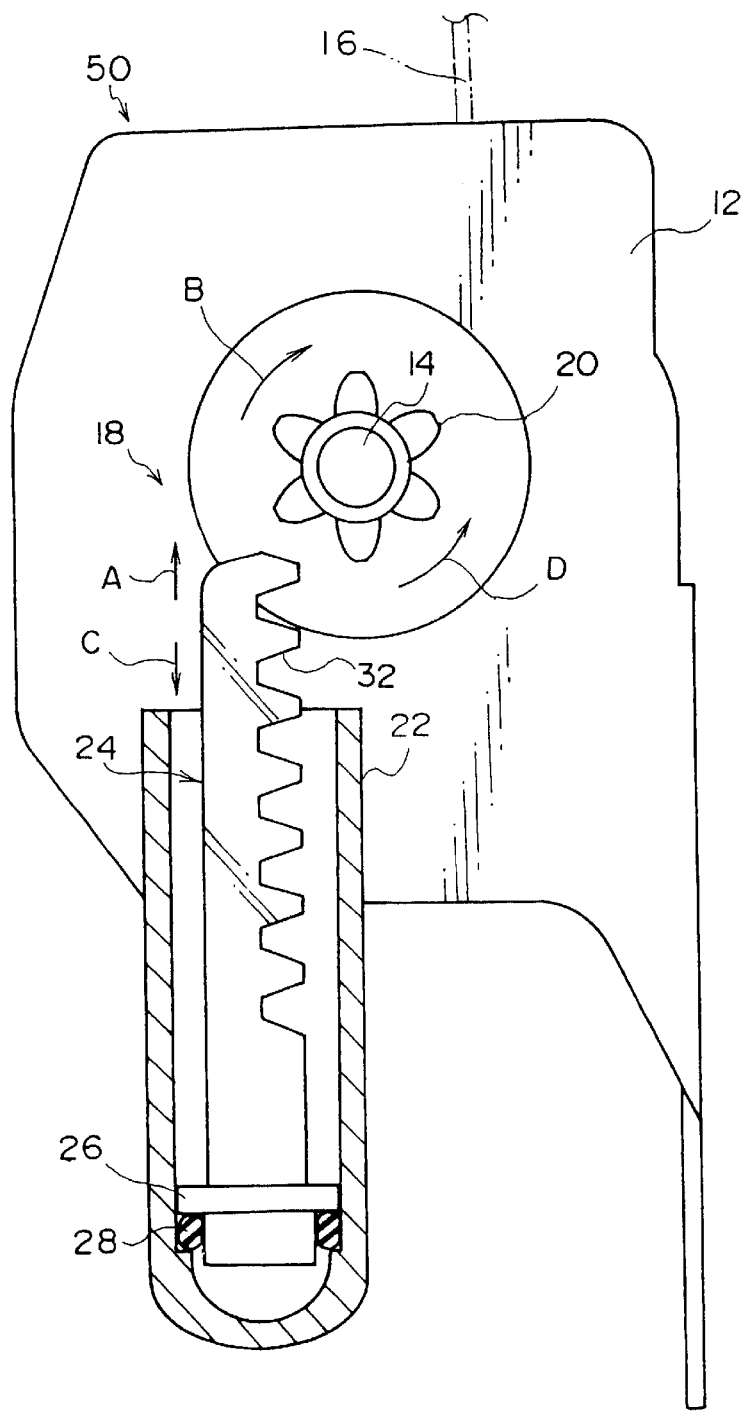
FIG. 4 is a side view of the schematic structure of the webbing retractor relating to a second embodiment of the present invention.

FIG. 4 is a right side view of the schematic structure of the webbing retractor 10 relating to a second embodiment of the present invention.

The webbing retractor 10 is almost the same as in the first embodiment except for the following points.

Figure 8A:
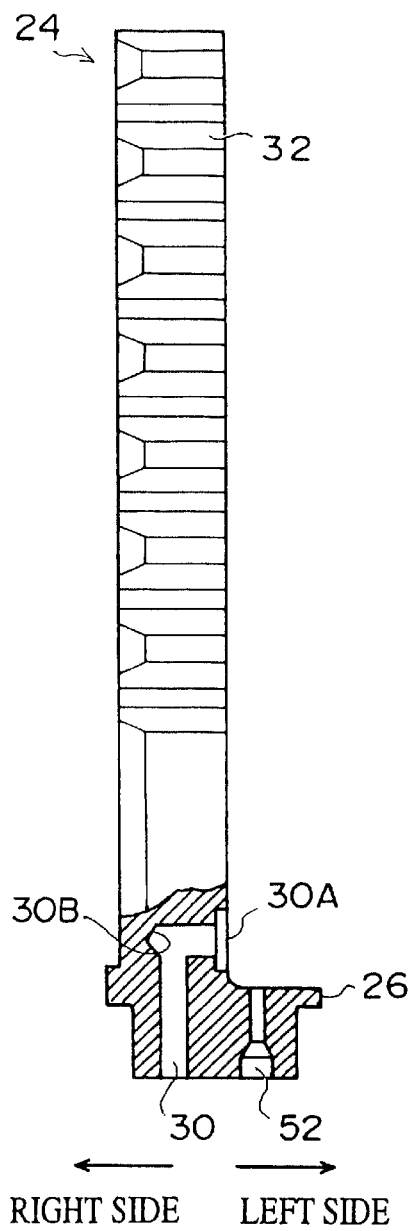
FIG. 8A is a rear view of the piston relating to the second embodiment.
Figure 8B:
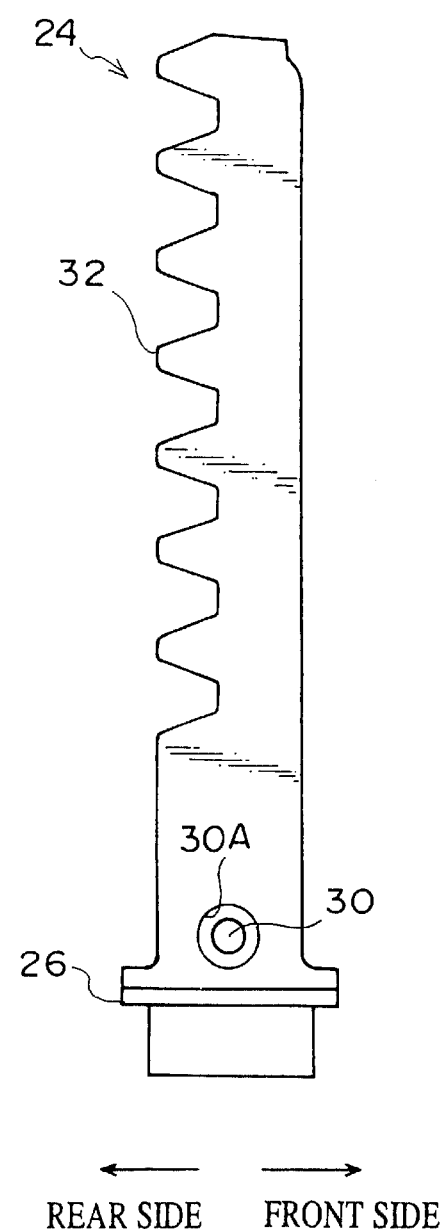
FIG. 8B is a left side view of the piston relating to the second embodiment.

As shown in FIGS. 8A and 8B, the rack 32 above the fitting portion 26 of the piston 24 is provided substantially at the right-hand side of the piston 24. The rack has a substantially rectangular cross-section.

The gas passing portion 30 formed at the lower portion of the piston 24 penetrates the piston 24 from the lower right end portion thereof to the lower portion of the left-hand side surface of the rack 32. The gas passing portion 30 is bent at a predetermined angle (90° in the second embodiment) in the vicinity of an opening 30A formed above the fitting portion 26 to form a bent portion 30B. The gas passing portion 30 has a larger diameter at the opening 30A than other portions.

A through hole 52 is formed at the lower portion of the piston 24. The through hole 52 penetrates the piston 24 from the lower left end portion thereof to the left portion of the upper surface of the fitting portion 26. The through hole 52 has a smaller diameter than that of the gas passing portion 30. Gas from the gas-supply opening is discharged via the through hole 52 from below to above the fitting portion 26.

Figure 5:
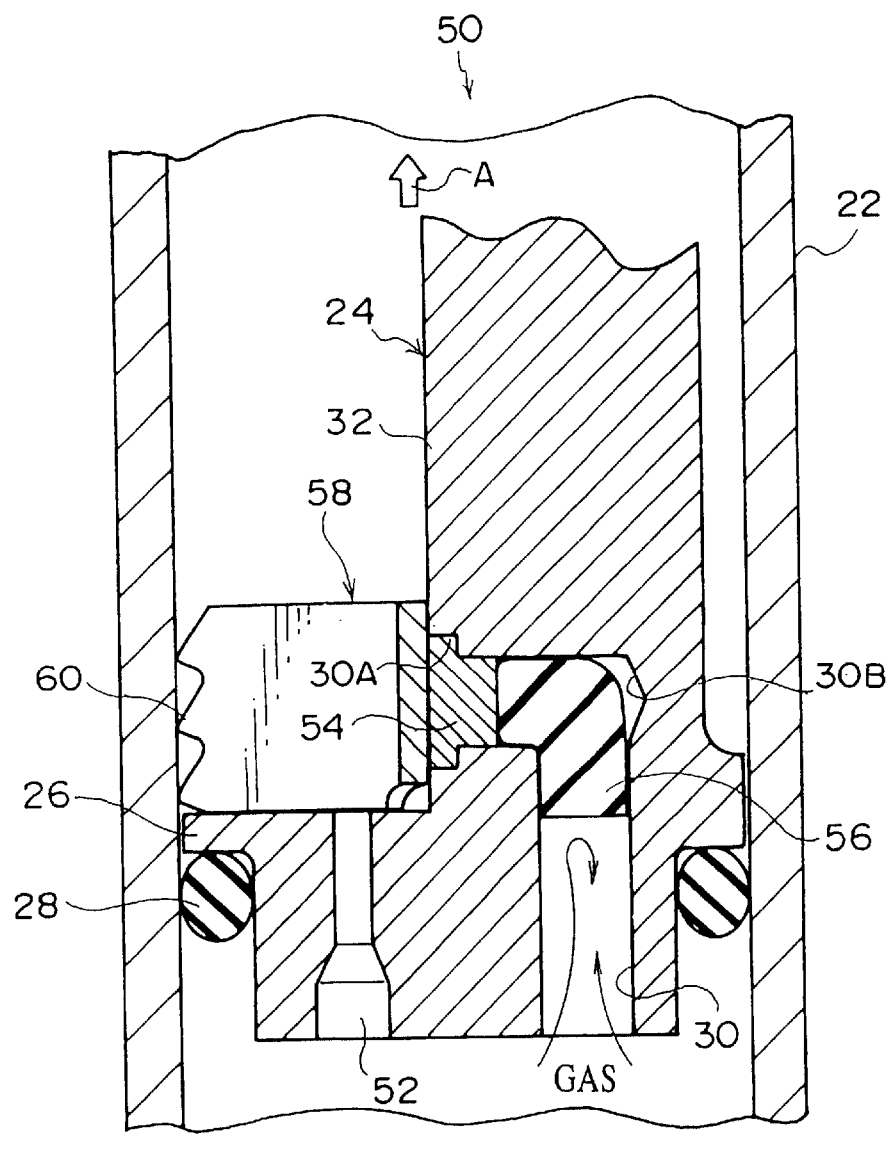
FIG. 5 is a right side view of the interior of the cylinder when the piston is moved upward by the pretensioner mechanism relating to with the second embodiment.
Figure 9:
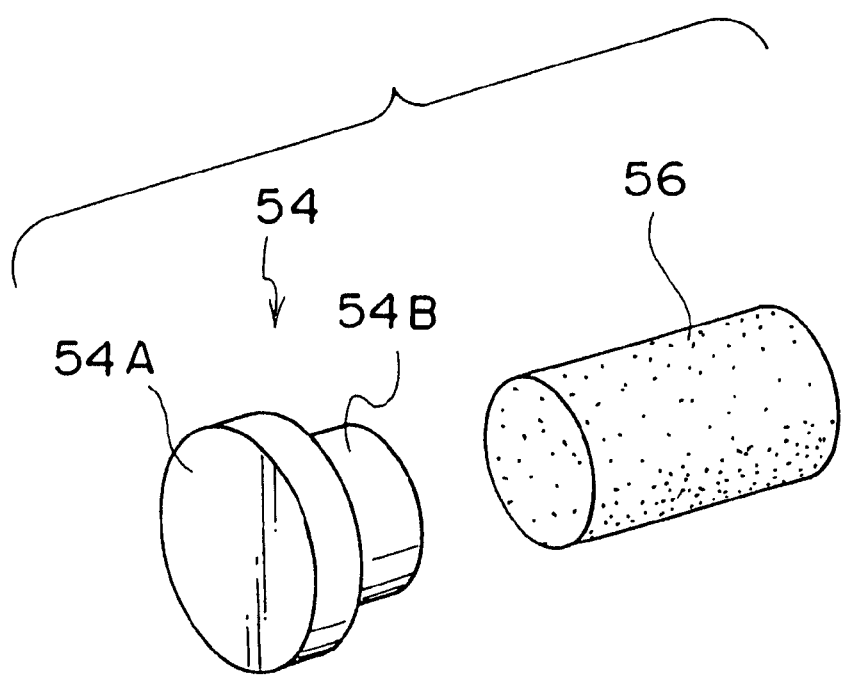
FIG. 9 is a perspective view of a cap and a rubber packing relating to the second embodiment.

The opening 30A of the gas passing portion 30 is closed by a cap 54 which structures a closing device also serving as an insertion member (see FIGS. 5, 6 and 9). The cap 54 is made of, for example, a polyacetal resin. At the cap 54, a large diameter portion 54A at the left-hand side is integral with a small diameter portion 54B at the right-hand side. The large diameter portion 54A is formed in a short cylindrical shape and fitted into the opening 30A. On the other hand, the small diameter portion 54B is formed in a short cylindrical shape having a smaller diameter than that of the large diameter portion 54A and fitted at a position adjacent to the opening 30A of the gas passing portion 30.

A cylindrical rubber filler 56 serving as the insertion member is substantially fitted into and inserted into the bent portion 30B of the gas passing portion 30 (see FIGS. 5, 6 and 9). One end of the rubber filler 56 contacts the small diameter portion 54B of the cap 54. The rubber filler 56 is made of rubber and has elasticity. The rubber filler 56 is bent and inserted into the bent portion 30B.

Figure 10:
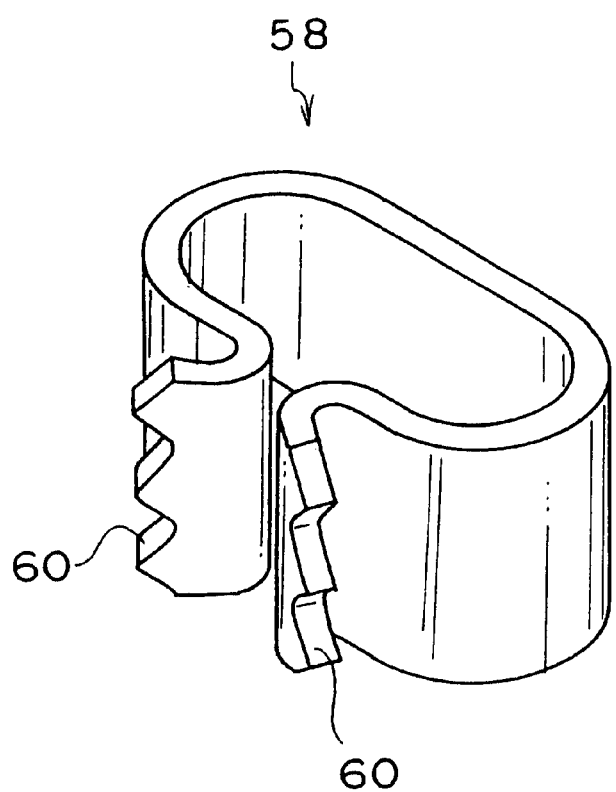
FIG. 10 is a perspective view of a retainer relating to the second embodiment.

A retainer 58 which is made of stainless and structures the closing device is disposed on the fitting portion 26 of the piston 24 so as to correspond to the gas passing portion 30 and the cap 54 (see FIGS. 5, 6 and 10). The retainer 58 is formed in a substantially elliptical hollow cylindrical shape. The left-hand side wall of the retainer 58 is opened at the longitudinal direction center. The retainer 58 is shrunk due to its elasticity and disposed between the inner wall of the cylinder 22 and the left side surface of the rack 32. As shown in FIG. 6, curved side walls of the retainer 58 in the vicinities of longitudinal direction end portions press the inner wall of the cylinder 22 and the planar right-hand side wall of the retainer 58 presses the left-hand side surface of the rack 32 and the cap 54.

Projecting portions 60 are formed at ends of the opening portion of the left-hand side wall of the retainer 58 so as to protrude toward the inner wall of the cylinder 22 (i.e., the left-hand side). A predetermined number of (e.g., three in FIG. 10) triangular portions are formed at each short side of the projecting portions 60 so as to form a wavy configuration. A distal end of each of the triangular portions is formed to be an acute angle. The distal ends of the projecting portions 60 point-contact or line-contact the inner wall of the cylinder 22 to press the same. At each triangular portion formed at the short side of the projecting portions 60, an inclining angle of a lower side with respect to the inner wall of the cylinder 22 is larger than that of an upper side.

In the webbing retractor 10 relating to the second embodiment, the retainer 58 disposed on the fitting portion 26 of the piston 24 presses the cap 54. Thus, the gas passing portion 30 closed by the cap 54 is inhibited by the retainer 58 from releasing. When a vehicle is in an emergency, gas is supplied within the cylinder 22 by the pretensioner mechanism 18, the gas within the cylinder 22 is not discharged from the gas passing portion 30. Thus, the piston 24 starts moving upward due to the gas pressure in the direction indicated by the arrow A in FIGS. 4 and 5 (i.e., toward the pinion 20).

As shown in FIG. 5, when the piston 24 is moved upward, the retainer 58 is pushed upward by the fitting portion 26 so as to be moved upward integrally with the piston 24. Thus, the state in which the gas passing portion 30 is closed by the cap 54 is maintained. In this way, the piston 24 continues to be moved upward and therefore the take-up shaft 14 is rotated via the rack 32 and the pinion 20 in the direction in which the webbing 16 is taken up (i.e., in the direction indicated by the arrow B in FIG. 4).

Figure 7:
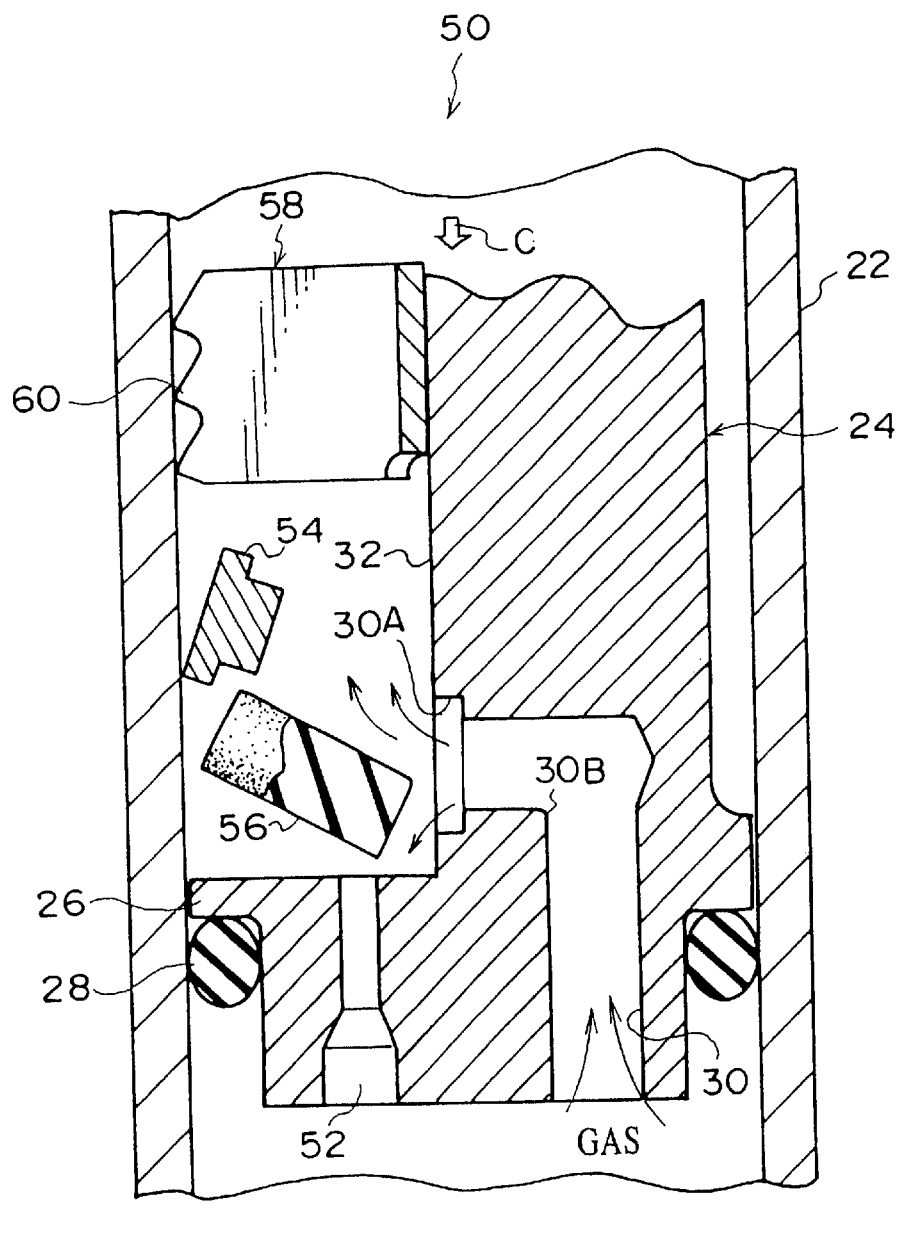
FIG. 7 is a side view of the interior of the cylinder when the piston is moved downward by the force limiter mechanism relating to the second embodiment.

When the take-up shaft 14 is rotated in the direction in which the webbing 16 is pulled out (i.e., in the direction indicated by the arrow D in FIG. 4) by the force limiter mechanism such that the piston 24 is moved downward via the pinion 20 and the rack 32 in the direction indicated by the arrow C in FIGS. 4 and 7, a load of a vehicle occupant upon the webbing 16 is transmitted via the take-up shaft 14, the pinion 20 and the rack 32 to the piston 24. Thus, the descending speed of the piston is faster than the speed at which the slider 34 is moved downward due to free fall. As shown in FIG. 7, the retainer 58 is remained further upward than the gas passing portion 30 is. Thus, closing of the gas passing portion 30 by the cap 54 is released (i.e., the cap 54 and the rubber filler 56 are discharged from the gas passing portion 30 due to the gas pressure) such that the gas passing portion 30 is opened. As a result, gas within the cylinder 22 (below the fitting portion 26) is discharged from the gas passing portion 30. It is possible to prevent that the gas in the cylinder 22 hinders downward movement of the piston 24 and pull-out of the webbing 16.

In the second embodiment, the force limiter load (i.e., a load required for the webbing 16 to be pulled out when a vehicle is in an emergency) can be determined by only a load required for the energy absorbing member to be deformed. Thus, the degree of freedom of the setting of the force limiter load can be broadened.

When the piston 24 is moved downward by the force limiter mechanism, the retainer 58 pushes the inner wall of the cylinder 22. At the same time, the projecting portions 60 of the retainer 58 rub the inner wall of the cylinder 22. Thus, friction is generated between the inner wall of the cylinder 22 and the retainer 58 such that the friction hinders relative movement of the retainer 58 to the cylinder 22. In this way, when the piston 24 is moved downward by the force limiter mechanism, the retainer 58 can be reliably remained further upward than the gas passing portion 30. Then, the gas passing portion 30 can be reliably opened.

Even when the piston 24 is moved upward by the pretensioner mechanism 18, and the pressing force of the retainer 58 and the friction of the projecting portions 60 work in the direction of hindering the relative movement of the retainer 58 to the cylinder 22, the retainer 58 is pushed upward by the fitting portion 26 regardless of the pressing force and the friction. Thus, when the piston 24 is moved upward by the pretensioner mechanism 18, the state in which the gas passing portion 30 is closed by the cap 54 can be still maintained by the retainer 58.

Under normal circumstances or when the piston 24 is moved upward by the pretensioner mechanism 18, the cap 54 and the rubber filler 56 are inserted into the gas passing portion 30. Thus, it is further possible to inhibit gas within the cylinder 22 from being discharged from the gas passing portion 30. As a result, it is possible to prevent a decrease in force for the piston 24 to be moved upward.

Further, under normal circumstances or when the piston 24 is moved upward by the pretensioner mechanism 18, the rubber filler 56 having elasticity is bent and inserted into the bent portion of the gas passing portion 30. Thus, under normal circumstances or when the piston 24 is moved upward by the pretensioner mechanism 18, the gas passing portion 30 can be closed by the rubber filler 56.

When the piston 24 is moved downward by the force limiter mechanism, the cap 54 and the rubber filler 56 are discharged from the gas passing portion 30 due to the gas pressure. Thus, gas within the cylinder 22 can be still discharged from the gas passing portion 30.

When the piston 24 is moved downward by the force limiter mechanism, gas within the cylinder 22 is discharged via the through hole 52 from below to above the fitting portion 26. Thus, it is further possible to prevent that the gas in the cylinder 22 hinders downward movement of the piston 24 and pull-out of the webbing 16.

The above-indicated retainer 58 and the cap 54 can be used as the closing device. An electric closing device which substantially closes or opens the gas passing portion is not needed. As a result, it is possible to simplify the structure of the closing device.

In the second embodiment, the retainer 58 and the cap 54 are used as the closing device, but a closing device which substantially electrically closes or opens the gas passing portion may be used.

Figure 11:
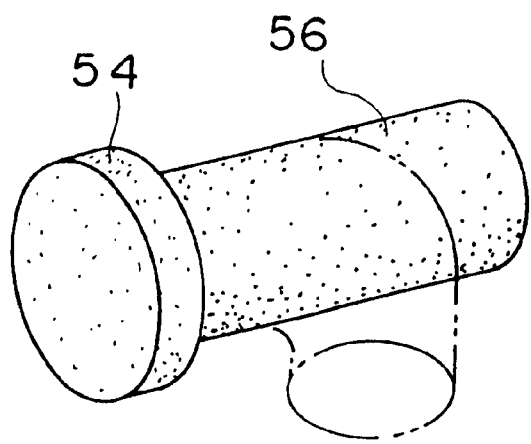
FIG. 11 is a perspective view of another example of the cap and the rubber packing relating to the second embodiment.
Figure 12:
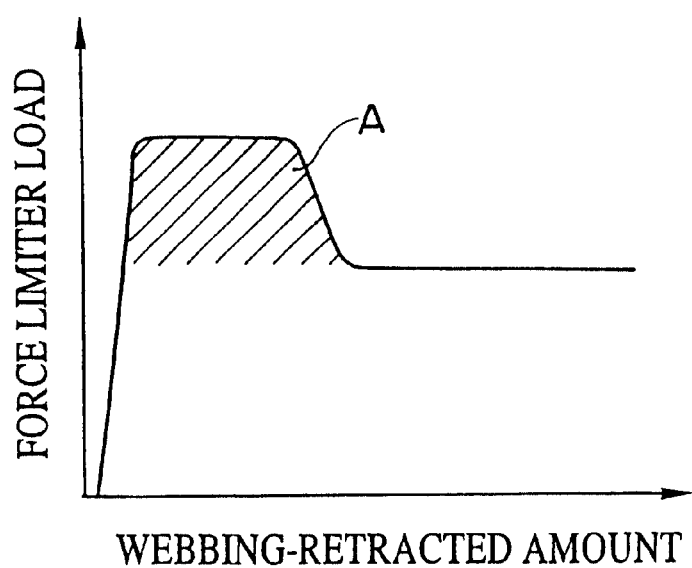
FIG. 12 is a graph showing the relationship between a force limiter load (vertical axis) and a pull-out amount of a webbing (horizontal axis) in a conventional webbing retractor.

In the second embodiment, the cap 54 and the rubber filler 56 are formed separately, but as shown in FIG. 11, the cap 54 and the rubber filler 56 may be formed integrally by using rubber.

What is claimed is:

1. A webbing retractor which includes a take-up shaft for taking up a webbing, a pretensioner mechanism which has a substantially hollow cylinder and a piston which is provided within said cylinder and with which a fitting portion which substantially fits into the inner wall of said cylinder is provided, and in which when a vehicle is in an emergency, gas is supplied within said cylinder and below said fitting portion such that said piston is moved upward due to the gas pressure to rotate said take-up shaft in the direction in which said webbing is taken up, and a force limiter mechanism having a deformable energy absorbing member in which when a vehicle is in an emergency, said energy absorbing member is deformed due to a load of a vehicle occupant upon said webbing such that said take-up shaft is rotated in the direction in which said webbing is pulled out to move said piston downward, said pretensioner mechanism comprising:

a gas passing portion which is provided at said piston and from which said gas can be discharged from below to above said fitting portion; and a closing device including a retaining means and a sealing means which is provided so as to correspond to a hole portion of said gas passing portion, and substantially closes said gas passing portion under normal circumstances, and maintains the state in which said gas passing portion is substantially closed when said piston is moved upward by said pretensioner mechanism, and which opens said gas passing portion when said piston is moved downward by said force limiter mechanism by the action of said retaining means releasing said sealing means.

2. The webbing retractor according to claim 1, wherein said closing device is disposed on said fitting portion to substantially close said gas passing portion under normal circumstances, when said piston is moved upward by said pretensioner mechanism, said closing device is pushed upward by said fitting portion such that the state in which said gas passing portion is substantially closed is maintained, and when said piston is moved downward by said force limiter mechanism, said retaining means closing device remains further upward than said gas passing portion, and said gas passing portion is thereby opened by the release of said sealing means.

3. The webbing retractor according to claim 1, wherein said sealing means includes a seal member which is provided so as to correspond to said gas passing portion and said seal member, generally interposed between said gas passing portion and said retaining means of said closing device so as to hermetically seal said gas passing portion, wherein when said piston is moved upward by said pretensioner mechanism, the state in which said seal member is interposed between said gas passing portion and said closing device is maintained such that the state in which said gas passing portion is closed is also maintained, and when said piston is moved downward by said force limiter mechanism, the state in which said seal member is interposed between said gas passing portion and said closing device is released such that said gas passing portion is opened.

4. The webbing retractor according to claim 2, wherein when said piston in moved downward by said force limiter mechanism, friction is generated between the inner wall of said cylinder and said closing device.

5. The webbing retractor according to claim 2, wherein said sealing means includes a seal member which is provided so as to correspond to said gas passing portion and said seal member, generally interposed between said gas passing portion and said closing device by said retaining means so as to hermetically seal said gas passing portion, wherein when said piston is moved upward by said pretensioner mechanism, the state in which said seal member is interposed between said gas passing portion and said closing device is maintained such that the state in which said gas passing portion is closed is also maintained, and when said piston is moved downward by said force limiter mechanism, the state in which said seal member is interposed between said gas passing portion and said closing device is released such that said gas passing portion is opened.

6. A webbing retractor which includes a pretensioner mechanism which eliminates slackness of a webbing using the gas pressure when a vehicle is in an emergency and a force limiter mechanism which limits a load exerted upon a vehicle occupant, said webbing retractor including a shaft for taking up said webbing, and said pretensioner comprising:
 a substantially hollow cylinder having first and second ends;
 a piston with which a fitting portion which is substantially fitted into said first end of the inner wall of said cylinder is provided;
 a gas passing portion which is provided at said piston and has a vent portion through which gas can flow; and
 a closing device which is provided adjacent to said fitting portion within said cylinder to prevent gas from passing through said gas passing portion, said closing device including a retaining means for retaining a sealing means over said gas passing portion when said piston moves from said first end of said cylinder to said second end, but which allowed said sealing means to disengage from said gas passing portion when said piston moves from said second end toward said first end of said cylinder,
 wherein retaining means of said closing device comprises a retainer which is adjacent to said fitting portion and can move along the inner wall of said cylinder, and said sealing includes a cap which is provided between gas passing portion and said retainer to substantially prevent said gas from passing through the gas passing portion, and an elastic member which can fit into said vent portion of said gas passing portion.

7. A webbing retractor which includes a take-up shaft for taking up a webbing, a pretensioner mechanism which has a substantially hollow cylinder and a piston which is provided within said cylinder and with which a fitting portion which substantially fits into the inner wall of said cylinder is provided, and in which when a vehicle is in an emergency, gas is supplied within the cylinder and below said fitting portion such that said piston is moved upward due to the gas pressure to rotate said take-up shaft in the direction in which said webbing is taken up, and a force limiter mechanism having a deformable energy absorbing member in which when a vehicle is in an emergency, said energy absorbing member is deformed due to a load of a vehicle occupant upon said webbing such that said take-up shaft is rotated in the direction in which said webbing is pulled out to move said piston downward,
 said pretensioner mechanism comprising:
 a gas passing portion which is provided at said piston and from which said gas can be discharged from below to above said fitting portion; and
 a closing device which has a sealing means which can substantially close said gas passing portion and a retaining means which is disposed on said fitting portion so as to be able to inhibit the state in which said gas passing portion is substantially closed by said sealing means from being released, the closing device wherein, when said piston is moved upward by said pretensioner mechanism, said retaining means is pushed upward by said fitting portion to maintain the state in which said gas passing portion is substantially closed by said sealing means, and when said piston is moved downward by said force limiter mechanism, said retaining means remains further upward than said fitting portion such that said sealing means is released.

8. The webbing retractor according to claim 7, wherein when the said piston is moved downward, friction is generated between the inner wall of said cylinder and said closing device.

9. The webbing retractor according to claim 7, wherein under normal circumstances or when said piston is moved upward by said pretensioner mechanism, said sealing means includes an insertion member that is inserted into said gas passing portion, and when said piston is moved downward by said force limiter mechanism, said insertion member is discharged from said gas passing portion due to the gas pressure.

10. The webbing retractor according to claim 8, wherein said sealing means includes an insertion member, and under normal circumstances or when said piston is moved upward by said pretensioner mechanism, said insertion member is inserted into said gas passing portion, and when said piston is moved downward by said force limiter mechanism, said insertion member is discharged from said gas passing portion due to the gas pressure.

11. The webbing retractor according to claim 9, wherein said gas passing portion has a bent portion and said insertion portion has elasticity, and under normal circumstances or when said piston is moved upward by said pretensioner mechanism, said insertion member is bent and inserted into said bent portion.

12. The webbing retractor according to claim 10, wherein said gas passing portion has a bent portion and said insertion portion has elasticity, and under normal circumstances or when said piston is moved upward by said pretensioner mechanism, said insertion member is bent and inserted into said bent portion.

13. A webbing retractor which includes a pretensioner mechanism which eliminates slackness of a webbing using the gas pressure when a vehicle is in an emergency and a force limiter mechanism which limits a load exerted upon a vehicle occupant, said webbing retractor including a shaft for taking up said webbing, and said pretensioner comprising:
   a substantially hollow cylinder having first and second ends;
   a piston with which a fitting portion which is substantially fitted into said first end of the inner wall of said cylinder is provided;
   a gas passing portion which is provided at said piston and has a vent portion through which gas can flow; and
   a closing device which is provided adjacent to said fitting portion within said cylinder to prevent gas from passing through said gas passing portion, said closing device including a retaining means for retaining a sealing means over said gas passing portion when said piston moves from said first end of said cylinder to said second end, but which allows said sealing means to disengage from said gas passing portion when said piston moves from said second end toward said first end of said cylinder.

14. The webbing retractor according to claim 13, wherein said retaining means of said closing device comprises a slider which is adjacent to said fitting portion and can move along the inner wall of said cylinder and said sealing means includes a seal member provided between said gas passing portion and said slider.

15. The webbing retractor according to claim 13, wherein retaining means of said closing device comprises a retainer which is adjacent to said fitting portion and can move along the inner wall of said cylinder, and said sealing includes a cap which is provided between gas passing portion and said retainer to substantially prevent said gas from passing through the gas passing portion, and an elastic member which can fit into said vent portion of said gas passing portion.

16. The webbing retractor according to claim 14, wherein said slider is formed substantially integrally with said seal member.

17. The webbing retractor according to claim 14, wherein when said piston is moved downward, a descending speed of said slider relative to a descending speed of said piston is substantially controlled by blowing the gas passing through said gas passing portion against said seal member.

18. The webbing retractor according to claim 15, wherein said retainer has projecting portions which protrude toward the interior of said cylinder, and in which said projecting portions are substantially capable of controlling the descending speed of said retainer relative to a descending speed of said piston.

19. The webbing retractor according to claim 15, wherein said cap is formed substantially integrally with said elastic member.

20. A webbing retractor which includes a take-up shaft for taking up a webbing, a pretensioner mechanism which has a substantially hollow cylinder and a piston which is provided within said cylinder and with which a fitting portion which substantially fits into the inner wall of said cylinder is provided, and in which when a vehicle is in an emergency, gas is supplied within said cylinder and below said fitting portion such that said piston is moved upward due to the gas pressure to rotate said take-up shaft in the direction in which said webbing is taken up, and a force limiter mechanism having a deformable energy absorbing member in which when a vehicle is in an emergency, said energy absorbing member is deformed due to a load of a vehicle occupant upon said webbing such that said take-up shaft is rotated in the direction in which said webbing is pulled out to move said piston downward,
   said pretensioner mechanism comprising:
      a gas passing portion which is provided at said piston and from which said gas can be discharged from below to above said fitting portion; and
      a closing device including a retaining means and a sealing means which is provided so as to correspond to a hole portion of said gas passing portion, and substantially closes said gas passing portion under normal circumstances, and maintains the state in which said gas passing portion is substantially closed when said piston is moved upward by said pretensioner mechanism, and which opens said gas passing portion when said piston is moved downward by said force limiter mechanism by the action of said retaining means releasing said sealing means;
   wherein said sealing means includes a seal member which is provided so as to correspond to said gas passing portion and said seal member, generally interposed between said gas passing portion and said retaining means of said closing device so as to hermetically seal said gas passing portion, wherein when said piston is moved upward by said pretensioner mechanism, the state in which said seal member is interposed between said gas passing portion and said closing device is maintained such that the state in which said gas passing portion is closed is also maintained, and when said piston is moved downward by said force limiter mechanism, the state in which said seal member is interposed between said gas passing portion and said closing device is released such that said gas passing portion is opened.

21. A webbing retractor which includes a take-up shaft for taking up a webbing, a pretensioner mechanism which has a substantially hollow cylinder and a piston which is provided within said cylinder and with which a fitting portion which substantially fits into the inner wall of said cylinder is provided, and in which when a vehicle is in an emergency, gas is supplied within the cylinder and below said fitting portion such that said piston is moved upward due to the gas pressure to rotate said take-up shaft in the direction in which said webbing is taken up, and a force limiter mechanism having a deformable energy absorbing member in which when a vehicle is in an emergency, said energy absorbing member is deformed due to a load of a vehicle occupant upon said webbing such that said take-up shaft is rotated in the direction in which said webbing is pulled out to move said piston downward,
   said pretensioner mechanism comprising:
      a gas passing portion which is provided at said piston and from which said gas can be discharged from below to above said fitting portion; and
      a closing device which has a sealing means which can substantially close said gas passing portion and a retaining means which is disposed on said fitting portion so as to be able to inhibit the state in which said gas passing portion is substantially closed by said sealing means from being released, the closing device wherein, when said piston is moved upward by said pretensioner mechanism, said retaining means is pushed upward by said fitting portion to maintain the state in which said gas passing portion is substantially closed by said sealing means, and when said piston is moved downward by said force limiter mechanism, said retaining means remains further upward than said fitting portion such that said sealing means is released wherein when the said piston is moved downward, friction is generated between the inner wall of said cylinder and said closing device.

22. A webbing retractor which includes a pretensioner mechanism which eliminates slackness of a webbing using the gas pressure when a vehicle is in an emergency and a force limiter mechanism which limits a load exerted upon a vehicle occupant, said webbing retractor including a shaft for taking up said webbing, and said pretensioner comprising:

a substantially hollow cylinder having first and second ends;

a piston with which a fitting portion which is substantially fitted into said first end of the inner wall of said cylinder is provided;

a gas passing portion which is provided at said piston and has a vent portion through which gas can flow; and a closing device which is provided adjacent to said fitting portion within said cylinder to prevent gas from passing through said gas passing portion, said closing device including a retaining means for retaining a sealing means over said gas passing portion when said piston moves from said first end of said cylinder to said second end, but which allows said sealing means to disengage from said gas passing portion when said piston moves from said second end toward said first end of said cylinder, wherein said retaining means of said closing device comprises a slider which is adjacent to said fitting portion and can move along the inner wall of said cylinder and said scaling means includes a seal member provided between said gas passing portion and said slider.

* * * * *